Jan. 26, 1954     H. L. BENNETT     2,667,238
COOLING MEANS FOR DYNAMOMETERS
Original Filed Feb. 19, 1941     2 Sheets-Sheet 1
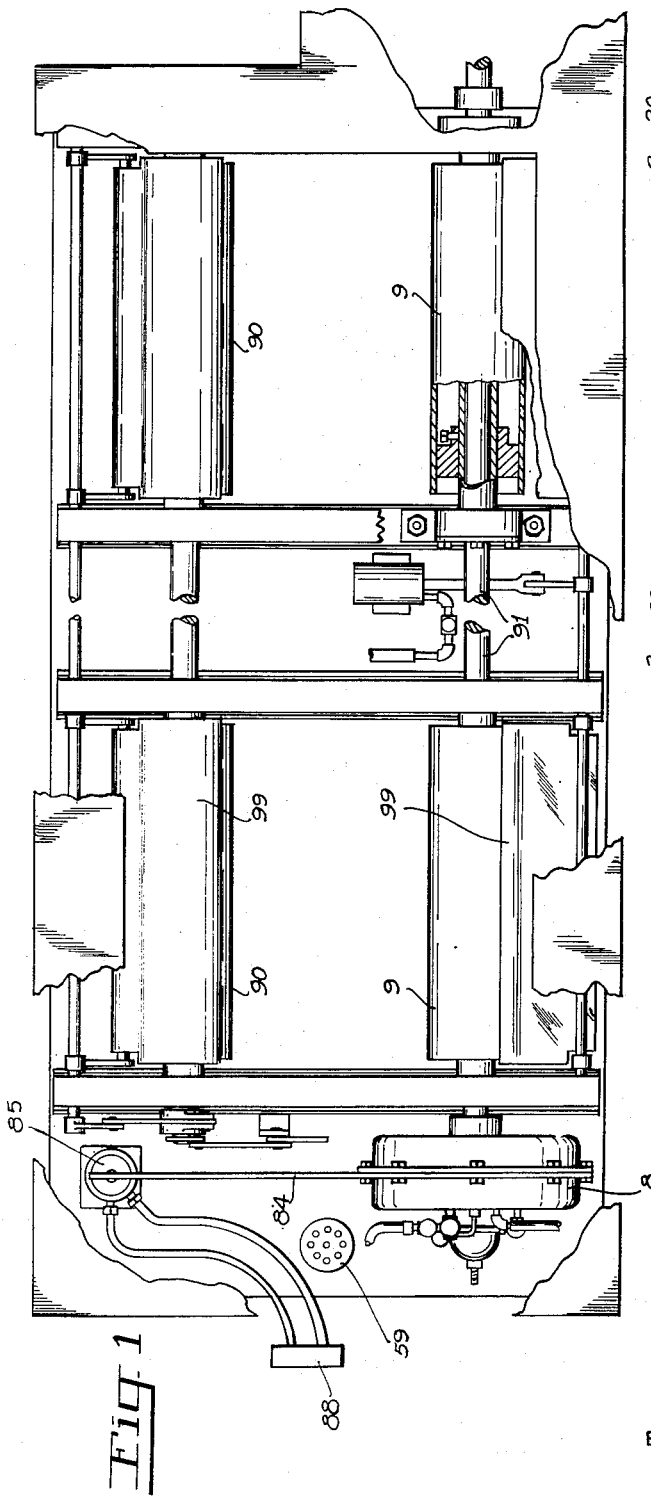
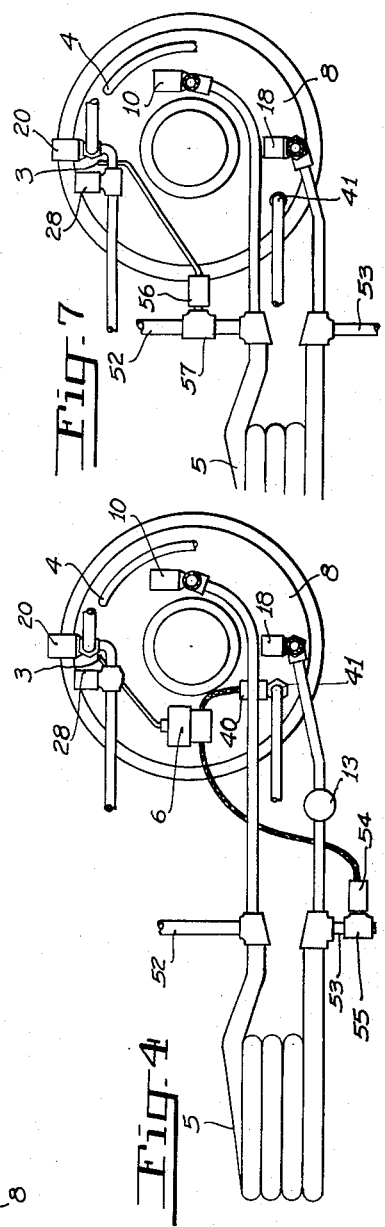
Inventor
HAROLD L. BENNETT
By Reynolds + Beach
Attorneys

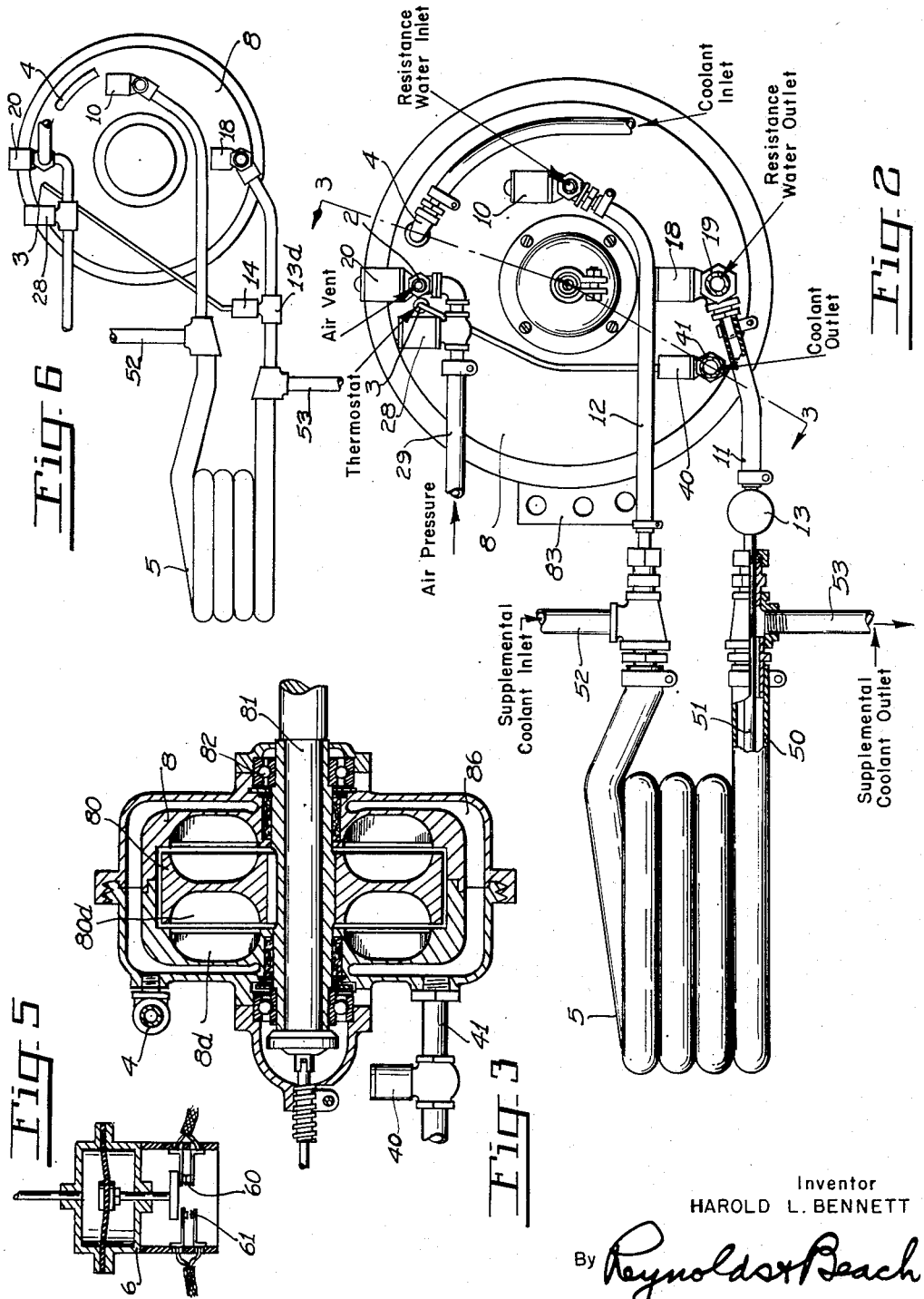

Patented Jan. 26, 1954

2,667,238

UNITED STATES PATENT OFFICE 2,667,238

COOLING MEANS FOR DYNAMOMETERS

Harold L. Bennett, South Bend, Ind., assignor, by mesne assignments, to Clayton Manufacturing Company, El Monte, Calif., a corporation Original application February 19, 1941, Serial No. 37,958. Divided and this application February 25, 1946, Serial No. 649,967

6 Claims. (Cl. 188—90)

The present invention relates to a dynamometer of the liquid resistance type, wherein a stator tends to rotate with a rotor due to the presence of liquid, which transmits torque from the rotor to the stator; the liquid is set into toroidal motion, absorbing the power applied to the rotor, and converting it into heat.

In passing it may be pointed out that it is immaterial, in the above arrangement, whether the rotor be the casing surrounding the stator, or the reverse. Normally the casing is relatively stationary, and the enclosed rotor is caused to rotate by the power source to which it is coupled.

The present invention, in one particular embodiment, relates also to a power testing machine for testing the power developed by an automobile engine, as delivered to the driving wheels of such automobile, and by these driving wheels impressed upon wheel-cradling rolls which are operatively connected to the dynamometer. The present invention is divided from my Patent No. 2,428,005, issued September 30, 1947, amplified by variant forms illustrating the principles involved. Whereas that patent is directed, among other things, to the relationship of the vanes in the stator and rotor, the relative disposition of their rims, and the expulsion of resistance water from the dynamometer casing and its recharging thereinto—in brief, to the control and operation of the resistance water in its coupling action within the casing—this application is directed to the manner of dissipating the heat generated by such operation, regardless of the specific structure by which the heat is generated in such a dynamometer, though still keeping in mind the conditions which must be maintained in a dynamometer, for the dependable accuracy, reproduceability, and stability required in its operation.

The quite appreciable quantity of heat generated by such power absorption must be dissipated or removed continuously and usually rapidly. The small volume of resistance liquid within the dynamometer casing becomes highly heated in a short period of time, under ordinary testing conditions. Changes of temperature of the resistance liquid create changes in its physical characteristics, such as changes of viscosity, and consequently in its ability to absorb power. Such changes may result in a change of phase, as from liquid to steam in the case of water, which is the resistance liquid usually employed in such dynamometers. The present power testing equipment is designed to be capable of use at relatively low speeds but at high power, such as is developed at the driving wheels of trucks under load, and under such conditions steam is produced quickly after the start of the test. Such changes of phase or other physical characteristic, then, produce marked variations in the resistance conditions, and produce variations and fluctuations in the test results, and in addition the conditions occurring during one test cannot be controllably reproduced under other conditions or during another test, and it follows that the results are not capable of comparison.

Because of the collateral results discussed above, it becomes necessary, in order to obtain dependable and substantially uniform results under like conditions, to control the temperature changes, particularly in the resistance liquid, and to maintain such changes within narrow limits, or substantially constant. This is the general object of the present invention.

It has been proposed heretofore to pass resistance water through such a dynamometer, during a test, so rapidly that it is not permitted to remain long enough that its temperature can change to a material degree, and thus to drain off and replace with cooler water that which has been heated to some extent in its passage through the dynamometer. This is not only a wasteful practice, but the instantaneous volume of water within the dynamometer can not be accurately stabilized, and hence its resistance varies uncontrollably; the temperature differences between inflowing and outflowing water may vary over an appreciable range, because of change of temperature of incoming water, or because of variations in the power absorbed, hence of the heat produced; and due to such variations, the test results themselves will vary, and be undependable. It is evident that such a practice contributes but little to the accuracy of the test results. Likewise, it has been proposed to pass the resistance liquid primarily through a water jacket, and thence into the interior of the dynamometer. This too has the result of admitting resistance liquid at an elevated temperature, which may not be the same under all conditions, and which may be so high under some conditions as to permit such heating of the water (according to the small or large volume retained within the resistance chamber) that its power absorption characteristics are materially different under some test conditions than under others. This has the disadvantage, in common with the first expedient, that the contained volume, during flow through the dynamometer, can never be kept dependably constant. In consequence, the accuracy of this procedure leaves much to be desired.

It is a further object of the present invention to provide means for cooling the resistance liquid, and furthermore, to provide means to this end which are separate from the resistance liquid itself, and still further, to provide means which are automatically responsive to increase in temperature of the resistance liquid, to effect compensating cooling of the resistance liquid, to the end that its temperature is at all times, and by means separate from the resistance liquid, automatically held to a value within a narrow range, or substantially constant, such that during any test operation its temperature is so nearly the same as it was during some other test operation that the two results are immediately and directly comparable.

It is also an object to produce the latter results regardless of the volume of resistance liquid contained in the dynamometer casing, or the degree or rapidity of its heating and hence to permit wide variation of the load imposed upon the engine or vehicle being tested, through variation of the volume of resistance liquid, without in the least affecting the means for maintaining substantially constant the temperature of that resistance liquid.

Since the power absorbed by the resistance liquid, and consequently the heat developed therein, and the temperature variations which tend to occur, are variable over a wide range, it is also an object to provide supplemental means, optionally usable, or automatically operable, whereby in the event the normal cooling means are inadequate to maintain the temperature of the resistance liquid below the maximum desired temperature, the cooling of the resistance liquid can be automatically supplemented, thereby still tending to maintain the temperature of the resistance water at or below the desired maximum.

With the above and similar objects in mind, as will appear more clearly as this specification progresses, and from the claims which terminate the same, the present invention comprises the novel dynamometer cooling means, as shown in the accompanying drawings in more or less diagrammatic fashion and in a representative form, and as is more fully explained in this specification and defined by the claims at the end thereof.

The drawings either show a representative embodiment of the invention in a power testing machine for automobiles, or represent, diagrammatically, various ways in which the principles of the invention may be adapted to the ends in view.

Figure 1 is a plan view, with parts broken away, showing the major portion of a vehicle power-testing machine which incorporates my invention in a preferred form.

Figure 2 is a side elevation of the dynamometer, illustrating the various means and controls for circulating the coolant liquid and for admitting and evacuating resistance liquid; parts of this view are broken away in section to show interior construction.

Figure 3 is an axial sectional view through the dynamometer unit taken substantially on the line 3—3 of Figure 2.

Figure 4 is a side elevation similar to Figure 2, illustrating a modified arrangement.

Figure 5 is a sectional view illustrating diagrammatically a detail of the automatic or thermostatic control employed in such an arrangement as that of Figure 4.

Figures 6 and 7 are side elevational views, each illustrating a different and further modification of the control arrangement.

The power tester illustrated in Figure 1 is of the type intended to operate directly from the driven wheels of an automobile or truck, the engine of which is to be tested. It comprises a forward roll 9 and a rear roll 90, constituting a pair spaced apart sufficiently to receive and cradle a driving wheel of the vehicle. Roll shields 99, which are the subject-matter of my Patent No. 2,397,461, issued April 2, 1946, the application for which was copending herewith and divided from the same parent application, now Patent No. 2,428,005 issued September 30, 1947, permit the vehicle to be driven backward off such rolls. One such pair of rolls is disposed at each side of the apparatus, the two pairs being spaced apart sufficiently to receive the driving wheels at the opposite sides of the vehicle. The front rolls 9 at both sides are secured to a common shaft 91, which in turn constitutes or is coupled to the dynamometer shaft 81.

The dynamometer, in the form illustrated, consists of an internal rotor 80 fast upon the shaft 81, and rotatable relative to a substantially stationary casing 8. The casing 8 is journaled at 82 upon the shaft 81, and by supporting means at 83 is connected through a long lever arm 84 to a pressure sensitive device 85 upon which the arm 84 presses more or less according to the resistance to rotation, as between the rotor 80 and the casing 8. An indicator 88, suitably calibrated, measures torque or other power factor.

Such resistance to rotation is developed by resistance liquid contained within the casing 8. Radial cups 80d and 8d in the rotor and casing, respectively, or other similar arrangements, all as are explained in greater detail in the parent Patent No. 2,428,005, upon rotation of the rotor 80 cause the contained liquid to circulate in toroidal whirls, and thereby to resist rotation of the rotor, or conversely, tend to cause the stator casing to rotate in conjunction with the rotor. The amount of liquid contained within the casing is variable in a manner which will shortly appear, and by this variation the resistance to rotation may be varied.

As a convenient means of effecting primary cooling of the resistance liquid, or more correctly, as a primary means of maintaining substantially constant during operation the temperature of the resistance liquid, the casing 8 is jacketed in any suitable structural manner, as indicated at 86 (see Figure 3), and means are provided for circulating through this jacket a coolant liquid. However, this is only one means of effecting temperature control, and any other suitable means may be employed equally well. The means for effecting and controlling circulation of the coolant liquid will be explained shortly.

By reference to Figure 2, or by reference to the parent Patent No. 2,428,005, it will be seen that there is provided at 1, subject to control by a solenoid valve 10, an inlet for the resistance liquid leading to the interior of the dynamometer casing. An outlet for this resistance liquid is provided at 19, subject to the control of a solenoid valve at 18. To assist in governing to a fine degree the volume of liquid within the casing, means are provided for venting it. An air vent opening is shown at 2 which may be controlled by a solenoid valve 20 which will be opened simultaneously with energization of solenoid valve 10 to allow water to flow into the dynamometer.

The air thus removed may be replaced by inflowing water without resistance, instead of compression of trapped air retarding its entrance and the volume of air thus compressed reducing the water capacity of the unit. Because air is allowed to escape freely through the venting connection, an increase in the water content of the turbine chamber may be produced at the greatest possible rate.

To assist in decreasing the amount of water in the dynamometer rapidly when the outlet control solenoid valve 18 is opened, I may supplement the pumping action of the rotor, if desired, by providing a second air solenoid valve 28 controlling the air pressure connection 29 to admit air under pressure into the central portion of the turbine chamber. This compressed air will assist in driving the water out of the outlet 19.

Instead of controlling the air vent positively by a solenoid valve, the valve 28 may be an automatic vacuum relief valve and the air vent opening control valve 20 may be merely an automatic pressure relief valve instead of being positively operated. In such case the latter valve may be set to open at a pressure five or ten pounds above atmospheric pressure to prevent any appreciable increase in air pressure within the turbine chamber. Thus the dynamometer casing may be completely filled with resistance liquid, may be completely evacuated, or may be filled or evacuated to any intermediate degree. Such controls may be so operated as to vary, as rapidly as may be required, the amount of contained liquid within the dynamometer casing in the course of any test, and while the dynamometer is running.

A thermally responsive element 3 is located either in the upper part of the coolant jacket 86, to which hot coolant would rise naturally, or it may be located in the turbine chamber or dynamometer casing itself, or in its circulating conduits. This thermally responsive element, as will later be pointed out, may be connected to operate automatically any one or more of several different controls. As shown in Figure 2 it is connected to a solenoid valve 40 controlling the outflow of coolant at 41. Coolant is admitted at 4, and this coolant, at a rate determined by the setting of the value at 40, circulates through the jacket 86, which may take the form of a cored jacket or of a coil located within the interior of the casing 8.

The jacket 86 constitutes a means in heat exchange relationship with the resistance liquid within the dynamometer casing 8, by which the heat generated by the churning of the resistance liquid can be removed and dissipated. In many cases, or under many conditions, the cooling effect of this primary heat exchanger, the water jacket 86, will be sufficient, but there will arise conditions under which the primary heat exchanger has insufficient capacity to absorb and dissipate with sufficient rapidity all the heat which can be generated under load and during a test. I therefore provide a supplemental heat exchanger 5, consisting of the coil 51 surrounded by the water jacket 50, the coil 51 being connected by the conduits 11 and 12 to the normal resistance liquid outlet 19 and inlet 1, respectively, and the surrounding jacket 50 being connected by conduits 52 and 53 respectively to coolant supply and to drain 59 or other point of disposal of the coolant. A valve 13 between the coil 51 and the outlet 19 typifies a means of controlling circulation of resistance liquid through the supplemental heat exchanger coil 51, and consequently of controlling initiation and termination of supplemental cooling. Means other than a valve such as this, or supplemental thereto, may be employed, as will appear later.

It may be noted at this point that, instead of testing an automobile engine indirectly through the driving wheels, the engine may be connected directly to the shaft 91, or otherwise directly to the dynamometer shaft 81. In such a case it may be advantageous to employ the coolant, before it enters at 4 or at 52, or both, as a coolant for the water jacket of the engine being tested, or the coolant after being used in the jackets 86 or 50, or both, may be conducted on to serve as a coolant for the engine being tested. In all cases, however, the coolant is maintained separate from the resistance liquid.

In the operation of the arrangement shown in Figure 2, a controlled quantity of resistance liquid, usually water, is admitted to the interior of the dynamometer casing 8 by manipulation of the inlet valve solenoid at 10, and the outlet valve solenoid at 18, and, as may be needed, by manipulation of the air vent at 2 and the air pressure connection at 29. The supplemental heat exchanger 5 is located at a sufficiently low point, with respect to the dynamometer casing 8, that when the dynamometer casing is filled the supplemental heat exchanger coil 51 is likewise filled, unless for some reason it is preferred to insert valves which will completely sever communication between the supplemental heat exchanger and the dynamometer. Circulation will not normally occur through the supplemental heat exchanger, however, except as the valve 13 is opened. The amount of resistance liquid contained within the dynamometer casing will be determined by the amount of resistance it is desired to supply, as a load working against the engine which is being tested. As the rotor 80 rotates the resistance liquid will be churned and will be given toroidal movement within the co-operating radial cups 8d and 80d of the stator and rotor respectively, in known manner. During such testing the amount of liquid contained within the dynamometer casing can be varied at will, as has already been explained.

The churning of the resistance liquid quickly heats it to a relatively high temperature, and to maintain its temperature below the point where there is any danger of formation of steam, or at or near an optimum point where best test results are obtained, the coolant is circulated through the jacket 86, entering at 4 and leaving at 41. The control element at 40 controls the flow of coolant, being responsive to the thermostat at 3, which is sensitive either to the temperature of the resistance liquid directly, or indirectly to that temperature through the temperature of the coolant. As the temperature rises, the thermostat 3 affects the solenoid or other control element at 40, to increase the rate of circulation of the coolant liquid through the jacket 86. Should the temperature still continue to rise, the valve 13 may be opened more or less, manually or by automatic means which will shortly be described, and the resistance water will commence to circulate through the supplemental heat exchanger coil 51. Coolant is permitted to circulate through the jacket 50 of the supplemental heat exchanger, entering at 52 and leaving at 53, and if desired, controls may be placed on the coolant thus circulated through the supplemental heater to control its rate of circulation, or the circulation rate of the resistance liquid through the supplemental heat exchanger coil 51 may be controlled by the valve 13. Either or both such controls may be automatic, and controlled by the temperature responsive element 3, or may be manual.

In Figure 4 is illustrated an arrangement wherein the thermally responsive element 3 controls the circulation of coolant first at the outlet 41, and thereafter at the outlet 53. The thermally responsive element 3, in this instance, affects the temperature responsive control element, such as 6 which is diagrammatically illustrated in Figure 5. When the dynamometer temperature reaches a given point the latter element's expanding liquid above a diaphragm 62 closes a switch 60 thereby energizing the solenoid 49 to open the valve at 41, and if the temperature continues to rise, further expansion above the diaphragm 62 closes, the switch 61 energizing a solenoid 54 controlling a valve 55 in the outlet 53. In this instance, the valve 13 may be omitted or may be controlled manually or automatically, as indicated by the broken lines illustrating control connections to valve 13 in Figure 4.

In Figure 6, the thermally responsive element 3 operates on the valve 13d through a solenoid or similar element 14 to effect circulation of resistance liquid through the supplemental heat exchanger whenever normal cooling by means of the jacket 86 proves insufficient to cool the dynamometer adequately. In this instance it may be assumed that circulation through the supplemental heat exchanger by way of the inlet 52 and outlet 53, is continuous, although it may be controlled in any manner such as has already been suggested.

In Figure 7 the automatic control element 40 has been omitted from the coolant outlet from the jacket 86, and the coolant is intended to circulate freely from the inlet 4 through the jacket 86 and from the outlet at 41, and the thermally responsive element 3 in this instance controls a solenoid or the like at 56 controlling the coolant inlet valve 57 in the line 52 to the supplemental heat exchanger 5. In other words, the thermally responsive element controls cooling within the supplemental heat exchanger rather than circulation within the jacket 86 itself.

It is obvious that there might be many other arrangements in which a thermally responsive element would accomplish control of circulation of coolant or of the resistance liquid, or both. The principle involved in all such cases is that the temperature of the resistance liquid is so controlled that it may be maintained below a given maximum, or within a narrow range, at such temperature as will afford the best results during a test, and at such a temperature as can be reproduced and maintained during all tests, so that tests made at one time are directly comparable with tests made at another time.

The possibility of employing a refrigerant as the coolant which circulates through the jacket 86 should not be overlooked. In such case means may be provided to regulate the period and rate of circulation of such refrigerant, corresponding to the valve 40.

I claim as my invention:

1. In a dynamometer of the liquid resistance type, means to maintain a predetermined quantity of resistance liquid therein, during operation, means in heat exchange relationship to said resistance liquid to cool it, means automatically operable in response to increase in temperature of the resistance liquid to vary compensatively the heat exchange rate of said heat exchange means, to cool the resistance liquid, and thereby automatically to maintain the resistance liquid at a substantially constant temperature during operation, supplemental heat exchange means in heat exchange relationship to said resistance liquid, operable to cool it but normally inoperative, and means automatically operable in response to an increase in temperature of the resistance liquid to a given temperature to effect operation of said supplemental heat exchange means for cooling said resistance liquid, so long as the temperature of the resistance liquid remains elevated above such given temperature.

2. In a dynamometer of the liquid resistance type, an external closed circuit circulating path to remove resistance liquid from said dynamometer and to return it thereto, means to supply a resistance liquid to said dynamometer and to said external circulating path and to remove such liquid therefrom, to maintain any desired quantity of resistance liquid within the dynamometer, a first cooling means in direct heat exchange relation to the resistance liquid contained in said dynamometer, a second cooling means in direct heat exchange relation to the resistance liquid circulating through said external path, and means operable automatically in accordance with the temperature of the resistance liquid, under load, to vary compensatively the cooling effect of said first cooling means, tending to maintain constant the temperature of said resistance liquid, and further means operable automatically upon elevation of resistance liquid temperature above a given value to vary compensatively the cooling effect of said second cooling means.

3. A torque absorption device comprising a jacketed stator casing having vanes therein and containing resistance liquid, a rotor in said stator and having vanes cooperating with said stator vanes to churn the resistance liquid for absorbing power, an external heat exchanger including a resistance liquid conduit connected to said casing for reception of resistance liquid therefrom and return thereto, and including a separate coolant conduit, in heat exchange relation to said resistance liquid conduit, first coolant supply means operable to supply coolant to said stator jacket, means operable to control said first coolant supply means, second coolant supply means operable to supply coolant to the heat exchanger's coolant conduit, means operable to control said second coolant supply means, temperature-sensitive means operable to sense changes of temperature of the resistance liquid, and means controlled by said temperature-sensitive means, operatively connected to at least one of said coolant supply control means, and operable automatically in response to variations in the temperature of the resistance liquid to regulate compensatively the supply of coolant effected by said coolant supply control means to which it is connected to maintain the resistance liquid at substantially constant temperature.

4. The torque absorption device defined in claim 3, the means controlled by the temperature sensitive means being operatively connected to both coolant supply control means and operable automatically in response to variations in the temperature of the resistance liquid to regulate compensatively the supply of coolant effected by the two coolant supply control means to maintain the resistance liquid at substantially constant temperature.

5. A dynamometer of the liquid resistance type, comprising a casing defining a space containing a resistance liquid, a conduit disposed externally of said casing, connected to the interior of said casing and forming therewith a closed circuit for removal or resistance liquid from and return to said casing, valve means operable to control circulation of resistance liquid through said conduit, external cooling means in heat exchange relationship with said conduit to cool the resistance liquid flowing therethrough, means operable to supply additional resistance liquid to said casing and conduit and to remove resistance liquid therefrom, internal cooling means defining a coolant compartment separated from but in heat exchange relationship with the casing space containing resistance liquid, control means operable to vary the rate of flow of coolant through the coolant compartment, means responsive to variations in temperature of the resistance liquid within said casing space and operatively connected to said control means, operable to regulate said control means automatically for tending to maintain constant the temperature of such resistance liquid, and further means likewise responsive to variations in temperature of the resistance liquid in said casing space and operatively connected to said valve means, operable to regulate said valve means automatically to vary the rate of circulation of resistance liquid through said conduit for supplemental cooling as necessary to maintain substantially constant the temperature of the resistance liquid within said casing space.

6. The dynamometer defined in claim 5, and means operable to control flow of coolant through the external cooling means automatically in response to variations in temperature of the resistance liquid in the casing space.

HAROLD L. BENNETT.

References Cited in the file of this patent

UNITED STATES PATENTS

| Number | Name | Date |
|---|---|---|
| 1,743,409 | Tracy | Jan. 14, 1930 |
| 1,915,547 | North et al. | June 27, 1933 |
| 2,102,181 | McCormick | Dec. 14, 1937 |
| 2,116,992 | Weaver | May 10, 1938 |
| 2,144,010 | Bennett | Jan. 17, 1939 |
| 2,152,489 | Lamb | Mar. 28, 1939 |
| 2,185,491 | Anderson | Jan. 2, 1940 |
| 2,189,189 | Bennett | Feb. 6, 1940 |
| 2,428,005 | Bennett | Sept. 30, 1947 |
| 2,452,550 | Cline | Nov. 2, 1948 |

FOREIGN PATENTS

| Number | Country | Date |
|---|---|---|
| 11,267 | Great Britain | May 10, 1911 |
| 466,436 | Great Britain | May 28, 1937 |